United States Patent [19]
Sickles, II

[11] 3,940,695
[45] Feb. 24, 1976

[54] DOPPLER CORRECTION OF TRANSMISSION FREQUENCIES
[75] Inventor: Louis Sickles, II, Cherry Hill, N.J.
[73] Assignee: RCA Corporation, New York, N.Y.
[22] Filed: Nov. 18, 1974
[21] Appl. No.: 524,764

[52] U.S. Cl. ................ 325/63; 325/4; 325/11; 325/17; 325/421; 343/179
[51] Int. Cl.² ........................................ H04B 7/00
[58] Field of Search .................. 325/418–423, 325/4, 9, 11, 17, 63, 346; 343/175, 176, 179, 113 DE, 114

[56] References Cited
UNITED STATES PATENTS
3,223,997   12/1965   Clark et al. .................... 343/8

Primary Examiner—George H. Libman
Assistant Examiner—Marc E. Bookbinder
Attorney, Agent, or Firm—Edward J. Norton; Joseph D. Lazar; Michael A. Lechter

[57] ABSTRACT

Transmissions from a moving, vehicle-mounted transmitter to a remote station are pre-compensated at the transmitter for doppler shift by measuring the doppler shift of signals from the remote station and compensating by the use of a digital multiplier the frequency of transmissions to the remote station in the opposite sense and in an amount equal to the ratio of the nominal transmission to reception frequencies times the measured doppler shift. Application to full and half duplex radios and provisions for frequency shift keying systems are disclosed.

6 Claims, 3 Drawing Figures

DOPPLER CORRECTION OF TRANSMISSION FREQUENCIES

BACKGROUND OF THE INVENTION

1. Field of the Invention

The present invention relates to doppler shift correction systems for use with high speed vehicles.

2. Description of the Prior Art

Radio communication involving high speed, high-performance aircraft, for example, may result in large doppler frequency shifts from the nominal carrier frequencies of the transmitted and received signals. Typically, the speeds of such aircraft are as high as 2,000 mph. Doppler shifts at such speeds are in the order of 1,200 Hz from the nominal carrier frequency at carrier frequencies on the order of 400 MHz. At higher carrier frequencies, the doppler shift may be even larger. Where the high performance aircraft requires doppler tracking for reception and communicates with a station which does not employ doppler tracking, the high performance aircraft must alter its transmission to compensate for doppler shift, making the net frequency shift approach zero at the station without tracking.

For example, where the remote station is simultaneously communicating with a number of high speed aircraft, and communications with the individual aircraft involve different doppler shifts, the remote station generally cannot track all of the different doppler shifts simultaneously. Thus, communications from the individual high speed aircraft to the remote station must be pre-compensated for doppler shift.

In some applications, a station moving at a low speed or a fixed station communicates mainly with other low speed or fixed stations and numerous high speed stations and hence for reasons of economy does not employ doppler tracking techniques. Thus, the high performance aircraft or station again must pre-compensate its transmissions to the fixed or low speed station for doppler shift, so that the net frequency shift in the signals received at the receiving station approaches zero. Some prior art systems require that a system master oscillator output frequency be modified to compensate for doppler shift. However, it is undesirable to change the master oscillator output frequency because it is generally the station reference.

Prior art systems, such as those described in U.S. Pat. Nos. 3,317,909 and 3,325,736 issued to R. M. Waetjen on May 2, 1967 and June 13, 1967, respectively, accomplish a doppler compensation, in effect, by frequency multiplying, inverting and retransmitting the signal received from the remote station. More specifically, such prior art systems first subtract a reference signal at the nominal reception frequency from the received signal. The difference signal is then frequency multiplied by the ratio of the nominal transmission frequency to the nominal reception freqency. The resultant signal is subtracted from a reference signal at nominal transmission frequency and the difference signal is transmitted to the remote station. The reference signals for the nominal transmission and reception frequencies are both generated from a submultiple of the nominal reception frequency in a synthesizer. Such systems are disadvantageous in that they require the use of tuned radio frequency components, as opposed to lighter, more dependable, less expensive direct current components. Another disadvantage of such systems is that the relationship between transmission and reception frequencies is limited to ratios that may be embodied in a practicable frequency multiplier. Moreover, in such systems the response of a station to a received signal is fixed at a single ratio, thus making the system unsuitable for use in situations where the nominal transmission and reception frequencies are independently variable.

The present invention provides digital means for generating a doppler corrected transmission, suitable for use in systems where the nominal transmission and reception frequencies are different and are frequently changed over a wide band of frequencies. In addition, the present invention provides doppler compensation means suitable for situations where the nominal transmission and reception frequencies are independently variable. The present invention is also suitable for use in frequency shift keying systems, wherein the frequency transmitted varies in accordance with binary data to be transmitted.

SUMMARY OF THE INVENTION

The present invention provides an apparatus for use in a first station for compensating doppler frequency shifts from predetermined reception and transmission frequencies in communications between the first station and a second, remote station. The apparatus comprises: input means at the first station for receiving signals from the remote station; doppler tracking means responsive to the received signals for generating a digital signal representative of frequency deviations in the received signals from the predetermined reception frequency; digital multiplier means receptive of the digital signal for generating a first doppler correction signal indicative of the frequency deviation in the received signals and a second doppler correction signal indicative of the frequency deviation in the received signals multiplied by the negative of the ratio of the predetermined transmission frequency to the predetermined reception frequency; and means receptive of the first and second doppler correction signals, received signals and signals to be transmitted from the first to the second station at the predetermined transmission frequency for translating in frequency the received signals according to the first doppler correction signal and the signals to be transmitted according to the second doppler correction signal.

DETAILED DESCRIPTION OF A PREFERRED EMBODIMENT

Figure 1:
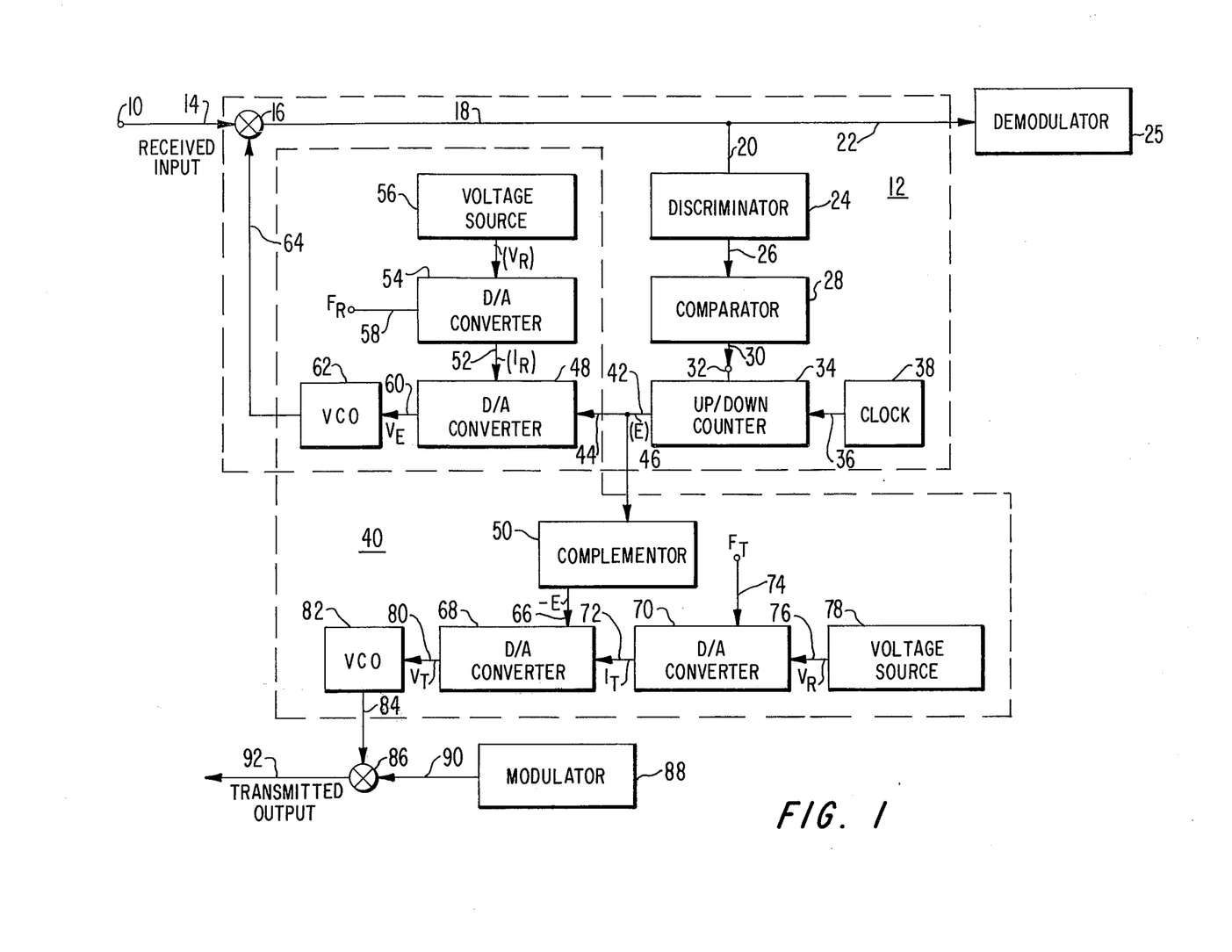
FIG. 1 is a block schematic of a full duplex radio apparatus in accordance with the present invention.

In the full duplex radio apparatus shown in FIG. 1, signals are received from a remote station at an input terminal 10 and applied therefrom to a suitable doppler tracking means, generally indicated as 12. Doppler tracking means 12 includes a doppler tracking loop. Specifically, the received signals are applied via conductor 14 to one input of a suitable mixer 16. Output signals from mixer 16 are applied via conductors 18, 22 to a demodulator 25 and via conductors 18, 20 to a frequency discriminator 24. Discriminator 24 is coupled via conductor 26 to a comparator 28, which in turn is coupled via conductor 30 to the up/down control terminal 32 of a conventional up/down counter 34. Up/down counter 34 is also receptive of clock signals via a conductor 36 from a conventional clock 38.

The output signal of the up/down counter 34, a digital signal indicative of the instantaneous contents of the counter 34, is applied to a digital multiplier, generally indicated as 40. More specifically, up/down counter 34 is coupled via conductors 42, 44 to a conventional digital to analog (D/A) converter 48 and via conductor 42, 46 to a conventional complementor 50. D/A converter 48 is receptive via a conductor 52 to the output signals of a conventional D/A converter 54. D/A converter 54 is, in turn, receptive of a reference voltage signal from a suitable voltage source 56 and via conductor 58 to a digital representation of the nominal carrier frequency of the received signals from the remote station, which is supplied from a suitable source, not shown. The output signals of D/A converter 48 are applied via conductor 60 to a conventional voltage controlled oscillator (VCO) 62, which is in turn coupled via conductor 64 to a second input terminal of mixer 16.

As noted above, up/down counter 34 is coupled via conductor 46 to complementor 50. The output signals of complementor 50 are applied via conductor 6 to a conventional D/A converter 68. D/A converter 68 is also receptive via conductor 72 to the output signals of a conventional D/A converter 70. A digital representation of the nominal transmission carrier frequency supplied from a suitable source, not shown, and a fixed reference voltage from a conventional voltage source 78 are supplied to the D/A converter 70 via conductors 74 and 76 respectively. The output signals of D/A converter 68 are applied via conductor 80 to a conventional VCO 82, which is in turn coupled via conductor 84 to a conventional mixer 86. The output signals from a suitable modulator 88 are applied via conductor 90 to a second input of the mixer 86. The output signals of mixer 86 are utilized via conductor 92 for transmission to the remote station.

In general, the operation of the apparatus depicted in FIG. 1 provides for signals from a remote station to be received at input terminal 10 and applied to doppler tracking means 12. Doppler tracking means 12 serves to generate a digital signal representative of frequency deviations in the received signals from a predetermined reception frequency (the nominal reception carrier). The digital representation of the frequency deviation is applied to digital multiplier 40, which generates first and second doppler correction signals. The first doppler correction signal is indicative of the frequency deviation and the second doppler correction signal is indicative of the frequency deviation multiplied by the negative of the ratio of the predetermined transmission frequency to the predetermined reception frequency. The received input signals from the remote station and the locally generated signals to be transmitted to the remote station are translated in frequency in accordance with the first and second doppler correction signals, respectively.

Signals received from the remote station at terminal 10 are corrected by the instantaneous first doppler correction signal in mixer 16 and are applied to discriminator 24. Discriminator 24 is tuned to the difference between the nominal VCO operating frequency and the nominal reception carrier frequency. Typically, the nominal VCO frequency and discriminator frequency are chosen in accordance with proper design practice and component availability, as understood in the art. To simplify the description, however, the following discussion will assume that the nominal operating frequency of VCO 62 is 0 Hz, i.e. d.c. Discriminator 24 is thus considered tuned to the nominal reception carrier frequency. Discriminator 24 generates a bipolar output signal with an amplitude and sense determined according to the frequency deviation of the corrected received signals from the nominal carrier frequency. For frequency shift keying systems, discriminator 24 may comprise a plurality of parallel channels, each channel including a conventional bandpass filter, respectively tuned to an associated "symbol" frequency i.e. the mark or space frequencies. The outputs of the filters are coupled to separate conventional discriminators tuned to the associated nominal mark or space frequencies. A more detailed description of such an embodiment will be given in conjunction with FIG. 3.

Up/down counter 34 is incremented or decremented in accordance with the output of discriminator 24. Specifically, comparator 28 senses the polarity of the output signal of discriminator 24 and generates a control signal to up/down counter 34, causing the counter 34 to increment or decrement accordingly at a fixed clock rate (clock 38). The contents of counter 34 are thus indicative of the frequency deviation of the received signal carrier from the nominal reception carrier. As will be further explained in conjunction with FIG. 3, in an FSK system the output of the particular discriminator associated with the instantaneous frequency of the received signal, i.e., the data output, is utilized to control the counter 34. Comparator 28 may also generate a signal to control the rate of increment or decrement of counter 34, i.e. the frequency of clock 38, in accordance with the magnitude of the deviation.

The digital representation of the frequency deviation is utilized by digital multiplier 40 to generate doppler correction signals for both the received signals and for signals to be transmitted to the remote station. The doppler correction signal for the received input signal is provided as follows. As previously mentioned, a digital representation, $F_R$, of the nominal reception carrier frequency is applied to D/A converter 54. D/A converter 54 suitably generates an output current equal to the product of the digital code $F_R$ and the applied reference voltage from voltage source 56. The D/A converter 48, responsive to the output current from the D/A converter 54 and to the digital code from counter 34 representative of the received signal carrier frequency deviation, generates an output voltage equal to the product of the received output current and digital representation of the instantaneous frequency deviation. Thus, representing the digital representation of the frequency deviation as E, the reference voltage as $V_R$, the digital representation of the nominal reception carrier frequency as $F_R$ and the output current of D/A converter 54 as $I_R$, the output voltage of D/A converter 48, $V_E$, may be represented as follows:

$$V_E = EI_R = E F_R V_R \qquad (1)$$

As described above, the output voltage of D/A converter 48 controls VCO 62 the output of which is applied to mixer 16, thus completing the tracking loop. VCO 62 generates the first doppler correction signal, which, because of the feedback nature of the circuitry, has a frequency equal to the frequency deviation of the received signal from the nominal reception carrier.

Specifically, where VCO 62 has a transfer function of K Hz/volt, the VCO output signal will be offset in frequency from its nominal operation frequency by the received doppler shift $\Delta f_r$; thus:

$$\Delta f_r = KV_E = E F_R K V_R \qquad (2)$$

It should be noted that a digital representation of the received doppler offset $\Delta f_r$ is retained in up/down counter 34 in the form of $$E = \Delta f_r / F_R K V_R \qquad (3)$$

The second doppler correction signal provided by the digital multiplier 40 is provided as follows. A digital representation of the nominal transmission carrier frequency $F_T$ is applied, as previously noted, to D/A converter 70. D/A converter 70 generates an output current, $I_T$, which is equal to the product of the nominal transmission carrier frequency and a reference voltage from voltage source 78, preferably of the same value, $V_R$, as generated by voltage soure 56. As previously described, D/A converter 68 receives the arithmetic complement (−E) of the digital representation of the frequency deviation of a received signal from the nominal carier frequency present in the up/down counter 34. D/A converter 68 generates an output voltage, $V_T$, equal to the product of the complemented frequency deviation and the output current, $I_T$, from D/A converter 70. Thus, representing the digital representation of frequency deviation as E, $$V_T = EI_T = EF_T V_R \qquad (4)$$

wherein the minus sign is indicative of the complementary function.

As described above, the output voltage of the D/A converter 68 is used to control VCO 82, the output signal of which offsets at the mixer 86 the signals to be transmitted to the remote station. VCO 82 preferably has the same nominal operating frequency and transfer function (K Hz/volt) as VCO 62. Thus, the frequency offset to the transmitted signals, $\Delta f_t$, is equal to:

$$\Delta f_t = EF_T K V_R \qquad (5)$$

It should be noted from equation 3 that $$E = \frac{\Delta f_R}{F_R K V_R} \qquad (6)$$

And substituting into equation 4 it is seen that $$\Delta f_t = -\Delta f_R \frac{F_T}{F_R} \qquad (7)$$

Thus, it will be appreciated that the transmissions from the apparatus of FIG. 1 to the remote station are compensated in frequency in the opposite sense and in an amount equal to a measured doppler shift times the ratio of the nominal transmission carrier frequency to the nominal received carrier frequency.

The present invention may also be embodied in a half duplex-radio apparatus. A digital multiplier comprising a single pair of D/A converters controls a single VCO. The current generating D/A converter has applied thereto, alternatively, digital representations of the nominal reception and transmission carrier frequencies in accordance with the instantaneous mode of operation. Similarly, the voltage generating D/A converter alternatively receives the digital representation of the received frequency deviation and the complement thereof in accordance with the instantaneous mode of operation. Such a half duplex apparatus is illustrated in FIG. 2, and a more detailed description of such an embodiment follows.

Figure 2:
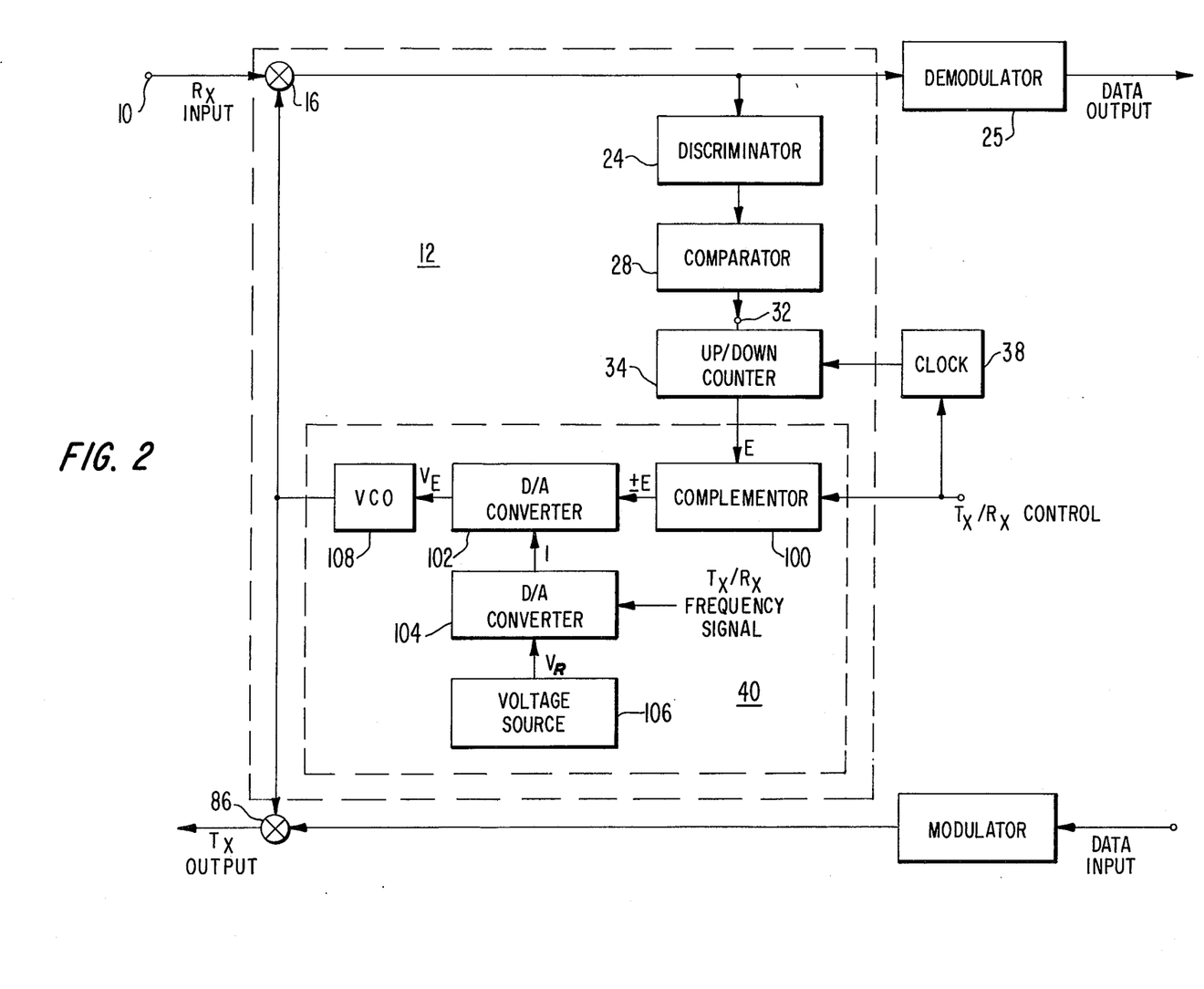
FIG. 2 is a block schematic of a half-duplex radio apparatus in accordance with the present invention.

With reference to FIG. 2, as in the full duplex apparatus of FIG. 1, signals are received from a remote station at input terminal 10 and are applied therefrom to a doppler tracking means, generally indicated as 12. Specifically, the received signals are applied to conventional mixer 16, which is coupled to a suitable discriminator 24 and suitable demodulator 25. Discriminator 24 is, in turn, coupled to a conventional voltage comparator 28. Comparator 28 is coupled to the up/down control terminal 32 of a conventional up/down counter 34, counter 34 also being receptive of clock signals from a conventional clock 38. Counter 34, is, in turn, coupled to digital multiplier 40, the output signals of which are mixed with the received signals in mixer 16 and with signals to be transmitted in mixer 86.

More specifically, the output signals of counter 34 are applied to a suitable complementor 100. Clock 38 and complementor 100 are also receptive of a control signal from a suitable source, not shown, indicative of the mode of operation of the apparatus, i.e., transmission or reception, hereinafter referred to as the Tx/Rx control. The output signals of complementor 100 are applied to a conventional D/A converter 102. D/A converter 102 is receptive of the output signals from D/A converter 104, which is, in turn, receptive of a reference voltage from voltage source 106 and a digital code alternatively representative of the nominal transmission or reception carrier frequencies, in accordance with the instantaneous mode of operation of the system. The output signal of D/A converter 102 is applied as a control to VCO 108, which is, in turn, coupled to mixers 16 and 86.

The operation of the half duplex apparatus of FIG. 2 is generally similar to that of the full duplex embodiment illustrated in FIG. 1. The signals from a remote station are received at input terminal 10 and applied to doppler tracking means 12. Doppler tracking means 12 serves to generate a digital signal representative of frequency deviations in the received signals from the nominal reception carrier frequency (or frequencies in an FSK system, as will be explained). The digital representation of the frequency deviation is applied to digital mltiplier 40 which generates first and second doppler correction signals, which are respectively indicative of the frequency deviation and of the frequency deviation multiplied by the negative of the ratio of the nominal transmission frequency to the nominal reception frequency. The received input signals from the remote station and signals to be transmitted to the remote station are translated in frequency in accordance with the first and second correction signal, respectively.

In the operation of a half-duplex apparatus in accordance with the present invention, signals received from the remote station are corrected by the instantaneous first doppler correction signal in mixer 16 and are applied to discriminator 24. Discriminator 24 of the half-duplex apparatus is tuned, as is the discriminator 24 of the full duplex unit depicted in FIG. 1, to the difference between the nominal operating frequency of VCO 108 and the nominal reception carrier frequency. As was the case with reference to the full duplex embodiment, the nominal VCO operating frequency will be assumed for the purposes of the following discussion to be 0 Hz, i.e., d.c. Discriminator 24 will thus be considered to be tuned to the nominal carrier frequency. Discriminator 24 generates an output signal with an amplitude proportional to the deviation of the corrected received signals from the nominal reception carrier frequency.

Up/down counter 34 is incremented or decremented in accordance with the polarity of the output signal of discriminator 24. The contents of counter 34 in the half duplex embodiment of FIG. 2 are indicative of the frequency deviation of the received signal from the nominal carrier.

The digital representation of the frequency deviation is applied to digital multiplier 40 which generates doppler correction frequency offset signals respectively for signals received from the remote station and for signals to be transmitted to the remote station. During the reception mode, D/A converter 104 receives a digital representation of the nominal reception carrier frequency. In addition, during the reception mode the Tx/Rx control signal to complementor 100 inhibits the complementation function, and the contents of up/down counter 34 are passed uncomplemented to D/A converter 102. Thus, during the reception mode, D/A converters 102 and 104 and voltage source 106 are analogous to and operate in the same manner as previously explained with respect to the D/A converters 48 and 54 and voltage source 56 in FIG. 1.

During the transmission mode, clock 38 is inhibited by the Tx control signal, complementor 100 provides the complement of the frequency deviation signal to D/A converter 102 and D/A converter 104 has applied thereto a digital representation of the nominal transmission carrier frequency. Since clock 38 is inhibited during the transmission mode, counter 34 in effect stores the received doppler offset $\Delta f_r$ for such times as the systems is transmitting. Thus, during the transmission mode, D/A converters 102 and 104 and voltage source 106 are analogous to, and operate in the same manner as D/A converters 68 and 70 and voltage source 78 in the full duplex apparatus of FIG. 1.

The digital multiplier 40 of the half duplex embodiment of FIG. 2 provides doppler correction signals in the same manner as does the digital multiplier 40 of the full duplex unit of FIG. 1. Specifically, denoting the instantaneous contents of up/down counter 34 as E, the digital representation of the nominal reception carrier frequency signal as $F_R$ and the value of the reference voltage as $V_R$, where VCO 108 has a transfer function of K Hz/volt, the doppler correction frequency offset during the receive mode, $\Delta f_r$, may be represented as:

$$\Delta f_r = E F_R K V_R \qquad (8)$$

Similarly, denoting the digital representation of the nominal transmission carrier frequency as $F_T$, during the transmission mode, the doppler correction frequency offset, $\Delta f_t$ may be represented as:

$$\Delta f_t = E F_T K V_R \qquad (9)$$

Noting from equation 6 that $$E = \frac{\Delta f_r}{F_R K V_R} \qquad (10)$$

It follows from substitution that $$\Delta f_t = -\Delta f_r \frac{F_T}{F_R} \qquad (11)$$

Figure 3:
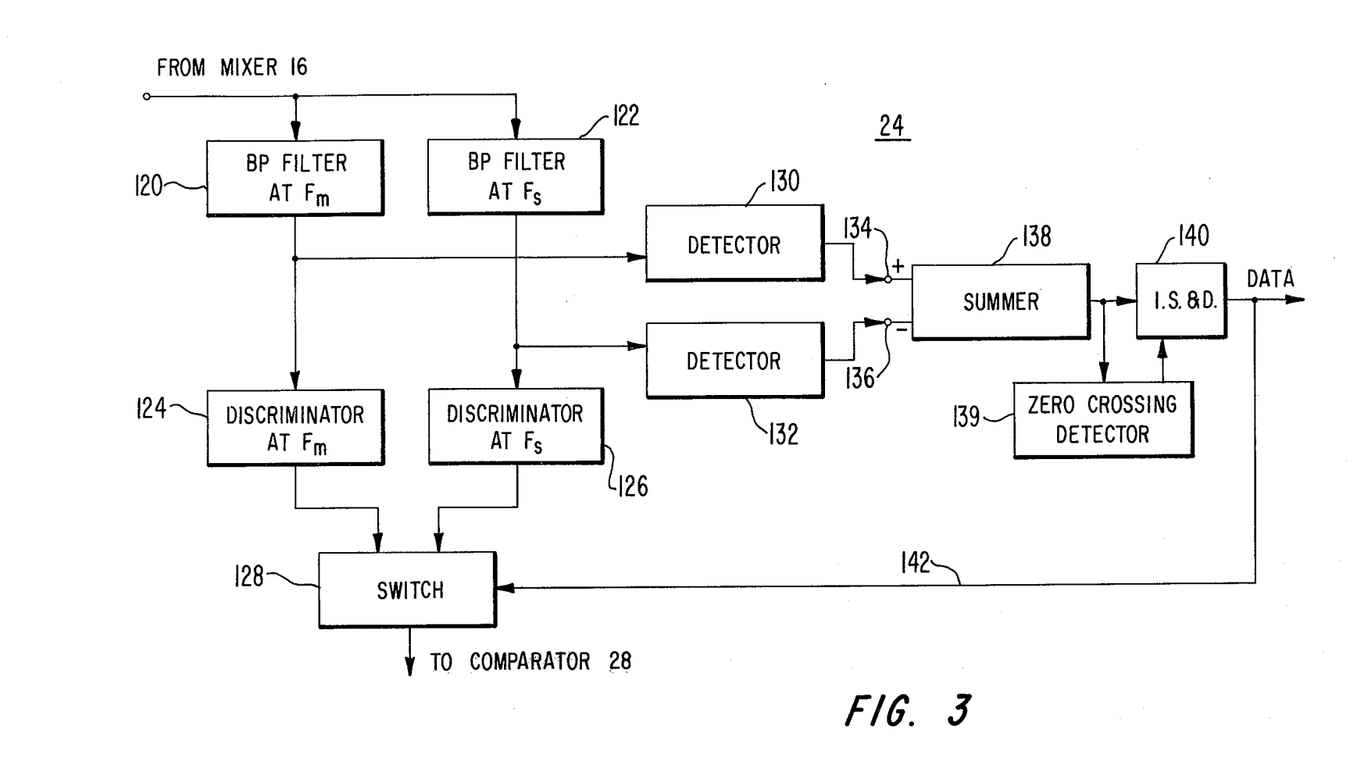
FIG. 3 is a block schematic of a suitable discriminator for use in the apparatus of FIGS. 1 and 2 in a frequency shift keying system.

As previously mentioned, discriminator 24 in a frequency shift keying (FSK) system (either half or full duplex) may comprise a plurality of parallel channels, respectively, tuned to the "symbol" frequencies. Such a discriminator 24 is illustrated in FIG. 3. Specifically, signals from mixer 16, FIGS. 1 and 2, are applied to bandpass filters (BPF) 120 and 122. BPFs 120 and 122 suitably have bandwidths in the order of 300 Hz at bit rates in the order of 75 bits per second and are respectively tuned to the difference between the doppler compensator VCO (62 and 82 in FIG. 1 or 108 in FIG. 2) nominal operating frequency and the nominal mark and space frequencies. BPFs 120 and 122 are respectively coupled to conventional discriminators 124 and 126. Discriminators 124 and 126 are respectively operated at the difference between the nominal VCO operating frequency and the nominal mark and space frequencies respectively. For simplicity, it will be assumed in the following discussion that the VCO nominal operating frequency is 0 Hz. Discriminators 124 and 126 are coupled to a conventional switch 128, which in turn is coupled to comparator 28 (FIGS. 1 and 2).

Bandpass filters 120 and 122 are also coupled to suitable signal detectors 130 and 132. The output signals of detectors 130 and 132 are respectively applied to a positive input terminal 134 and a negative input terminal 136 of a conventional voltage summer 138. Summer 138 is coupled to a suitable integrate, sample and dump (IS&D) circuit 140. Output signals from IS&D circuit 140 are applied over conductor 142 as a control signal to switch 128.

Discriminators 124 and 126 generate output signals indicative of the frequency deviations of the received mark and space signals, respectfully, from the nominal mark and space frequencies. Signal detector 130, in conjunction with bandpass filter 120 and detector 132, in conjunction with bandpass filter 122, serve to detect the presence of mark and space signals, respectively. As noted above, the output signals of detectors 130 and 132 are applied to a positive and a negative input terminal respectively of summer 138. Noting that the occurrence of mark and space frequencies in an FSK system are ideally mutually exclusive, it is seen that summer 138 develops a bipolar signal, with polarity indicative of the instantaneous received data.

As described above, the bipolar signal from summer 138 is applied to a suitable integrate sample and dump circuit 140. IS&D circuit 140 is suitably a capacitive circuit, in which a capacitor changes in accordance with the bipolar signal, is sampled, at the (data) bit rate, for the polarity of the charge, and then is discharged. The sampling clock may be derived by detecting zero crossings in the bipolar signal from summer 138 as by a suitable zero crossing detector 139. The output of IS&D circuit 140 is thus a reconstruction of the data received from the remote station. As noted above the data signal is applied over conductor 142 as a control signal to switch 128. Switch 128 serves to apply only the output signal of the particular discriminator associated with the instantaneous frequency of the received signal, i.e. the data output, to comparator 28.

It should be noted that, while the various conductors interconnecting the elements of the drawing are shown as single lines, they are not so shown in a limiting sense and may comprise plural connections as understood in the art.

It will be further understood that the above description is of illustrative embodiments of the present invention, and that the invention is not limited to the specific form shown. Modifications may be made in the design and arrangement of the elements without departing from the spirit of the invention as will be apparent to those skilled in the art.

What is claimed is:

1. Apparatus for pre-compensating for doppler shift in a signal to be transmitted to a remote station comprising:
   a. means, receptive of a signal from said remote station, said received signal deviating in frequency from a predetermined reception frequency due to doppler shift, for providing a digital signal representative of said frequency deviation;
   b. digital multiplier means, responsive to said representative signal, for generating a doppler correction signal indicative of said frequency deviation multiplied by the negative of the ratio of a predetermined transmission frequency for said transmitted signal to said predetermined reception frequency; and
   c. means, responsive to said doppler correction signal and to said signal to be transmitted, for translating in frequency said signal to be transmitted according to said doppler correction signal.

2. Apparatus for compensating for doppler frequency deviations in communications between a first station and a second station comprising:
   a. input means at said first station for receiving signals from said second station;
   b. doppler tracking means responsive to said received signals for generating a digital signal representative of frequency deviations in said received signals from a predetermined reception frequency;
   c. digital multiplier means receptive of said digital signal for providing a first doppler correction signal indicative of said frequency deviation and a second doppler correction signal indicative of said frequency deviation multiplied by the negative of the ratio of a predetermined transmission frequency to said predetermined reception frequency; and
   d. means at said first station receptive of said first and second doppler correction signals, said received signals and signals to be transmitted from said first station to said second station at said predetermined transmission frequency for translating in frequency said received signals according to said first doppler correction signal and the signals to be transmitted according to said second doppler correction signal.

3. The apparatus of claim 2, wherein said digital multiplier means comprises:
   a. a first digital to analog (D/A) converter means to which is applied a digital signal representative of said predetermined reception frequency for generating an output current having a magnitude indicative of said predetermined reception frequency,
   b. a second D/A converter means responsive to said output current from first D/A converter means and to said frequency deviation digital signal for generating an output voltage having a magnitude equal to the product of said current magnitude and the value of said frequency deviation,
   c. a first voltage controlled oscillator (VCO), responsive to said output voltage from said second D/A converter means for generating said first doppler correction signal,
   d. complementor means receptive of said frequency deviation digital signal for producing a signal indicative of the complement of said frequency deviation digital signal,
   e. third D/A converter means to which is applied a digital signal representative of said predetermined transmission frequency for generating an output current having a magnitude indicative of said predetermined transmission frequency,
   f. fourth D/A converter means responsive to said third D/A converter means output current and said complement signal for generating an output voltage with magnitude equal to the product of the magnitude of said third D/A converter means output current and the value of said complement of said frequency deviation,
   g. a second VCO responsive to said fourth D/A converter means output voltage for generating said second doppler correction signal.

4. The apparatus of claim 2, wherein said digital multiplier means comprises
   a. a first digital to analog (D/A) converter means to which is selectively applied first and second digital signals respectively representative of said predetermined reception and transmission frequencies for generating an output signal having a current with magnitude indicative of the value of the applied signal,
   b. complementor means responsive to said frequency deviation digital signal and to a signal indicative of which of said first and second digital signals is being instantaneously applied to said first D/A converter means for generating an output signal representative either of said frequency deviation signal or of the complement thereof in accordance with which of said first and second digital signals is being instantaneously applied to said first D/A converter means,
   c. a second D/A converter means responsive to said first D/A converter means output signal and to said complementor output signal for generating an output signal having a voltage equal to the product of the magnitude of said output current of said first D/A converter and the value of said complementor output signal, and
   d. a voltage controlled oscillator responsive to said second D/A converter means output signal for generating either said first or said second doppler correction signals according to which of said first and second digital signals is being applied to said first D/A converter means.

5. The apparatus of claim 2, wherein said doppler tracking means includes:
   a. discriminator means receptive of signals indicative of said received signals for generating a first control signal indicative of the frequency deviation of said received signals from said predetermined reception frequency;
   b. an up/down counter responsive to said first control signal and to clock signals having a predetermined frequency for generating a digital signal representative of said frequency derivations in said received signals from said predetermined reception frequency.

6. The apparatus of claim 5 wherein said discriminator means comprises:
   first and second bandpass filter means each receptive of said signals indicative of said received signals for passing respectively only signals within a predetermined bandwidth from a predetermined first frequency and second frequency;
   b. first and second discriminators receptive of the respective output signals of said first and second filter means, for respectively generating signals indicative of frequency deviations of said received signals from said predetermined first and second frequencies;

c. signal detector means receptive of the output signals of said first and second filter means for generating a second control signal indicative of the presence of said first or second frequencies in said received signals; and d. switching means responsive to the output signals of said first and second discriminators and to said second control signal for generating said first control signal.

* * * * *

UNITED STATES PATENT OFFICE
CERTIFICATE OF CORRECTION

PATENT NO. : 3,940,695
DATED : Feb. 24, 1976
INVENTOR(S) : Louis Sickles, II

It is certified that error appears in the above-identified patent and that said Letters Patent are hereby corrected as shown below:

Col. 5, line 21, change "carier" to --carrier--

Col. 5, line 28, change "$EI_T$" to -- $-EI_T$ --

Col. 5, line 28, change "$EF_T V_R$" to -- $-EF_T V_R$ --

Col. 5, line 37, change "$EF_T KV_R$" to -- $-EF_T KV_R$ --

Col. 7, line 31, change "systems" to --system--

Col. 7, line 51, change "E" to -- -E --

Col. 10, line 60, before "first" insert --a.--

Signed and Sealed this eleventh Day of May 1976

[SEAL]

Attest:

RUTH C. MASON
*Attesting Officer*

C. MARSHALL DANN
*Commissioner of Patents and Trademarks*